(12) United States Patent
Fagg et al.

(10) Patent No.: US 11,593,950 B2
(45) Date of Patent: *Feb. 28, 2023

(54) SYSTEM AND METHOD FOR MOVEMENT DETECTION

(71) Applicant: UATC, LLC, San Francisco, CA (US)

(72) Inventors: Ashton James Fagg, Pittsburgh, PA (US); Narek Melik-Barkhudarov, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/181,688

(22) Filed: Feb. 22, 2021

(65) Prior Publication Data

US 2021/0201507 A1    Jul. 1, 2021

Related U.S. Application Data

(63) Continuation of application No. 16/299,527, filed on Mar. 12, 2019, now Pat. No. 10,943,355.

(Continued)

(51) Int. Cl.
*G06K 9/00* (2022.01)
*G06T 7/246* (2017.01)
(Continued)

(52) U.S. Cl.
CPC ........... *G06T 7/248* (2017.01); *G05D 1/0246* (2013.01); *G06K 9/629* (2013.01); *G06V 20/56* (2022.01);
(Continued)

(58) Field of Classification Search
CPC ........... G06T 7/248; G06T 2207/10028; G06T 2207/30252; G06T 2207/10016;
(Continued)

(56) References Cited

U.S. PATENT DOCUMENTS 9,672,446 B1    6/2017  Vallespi-Gonzalez
10,108,867 B1 * 10/2018  Vallespi-Gonzalez ......................
                                                        G06V 10/955

(Continued)

OTHER PUBLICATIONS

Totolos et al., U.S. Appl. No. 15/496,144, filed Apr. 25, 2017, FPGA for Image Classification.

(Continued)

*Primary Examiner* — Dhaval V Patel
(74) *Attorney, Agent, or Firm* — Dority & Manning, P.A.

(57) ABSTRACT

Systems and methods for movement detection are provided. In one example embodiment, a computer-implemented method includes obtaining image data and range data representing a scene external to an autonomous vehicle, the image data including at least a first image and a second image that depict the scene. The method includes identifying a set of corresponding image features from the image data, the set of corresponding image features including a first feature in the first image having a correspondence with a second feature in the second image. The method includes determining a respective distance for each of the first feature and the second feature based at least in part on the range data. The method includes determining a velocity associated with a portion of a scene represented by the set of corresponding image features based at least in part on the respective distance for the first feature and the second feature.

20 Claims, 7 Drawing Sheets

Related U.S. Application Data

(60) Provisional application No. 62/799,314, filed on Jan. 31, 2019.

(51) Int. Cl.
    *G06K 9/62*     (2022.01)
    *G05D 1/02*     (2020.01)
    *G06V 20/56*     (2022.01)

(52) U.S. Cl.
    CPC ............... *G06T 2207/10028* (2013.01); *G06T 2207/30252* (2013.01)

(58) Field of Classification Search
    CPC . G06T 2207/10024; G06T 2207/30261; G06T 7/246; G05D 1/0246; G06K 9/629; G06V 20/56; G06V 20/58
    See application file for complete search history.

(56) References Cited

U.S. PATENT DOCUMENTS

| | | | |
|---|---|---|---|
| 10,943,355 | B2 * | 3/2021 | Fagg ...................... G06V 20/56 |
| 2014/0002650 | A1 * | 1/2014 | Zeng .................... H04N 13/106 348/148 |
| 2018/0005052 | A1 | 1/2018 | Melik-Barkhudarov et al. |
| 2018/0005053 | A1 | 1/2018 | Melik-Barkhudarov et al. |
| 2018/0154899 | A1 * | 6/2018 | Tiwari ................. G05D 1/0217 |
| 2018/0188427 | A1 | 7/2018 | Brueckner et al. |
| 2018/0275667 | A1 | 9/2018 | Liu et al. |
| 2018/0288320 | A1 | 10/2018 | Melick et al. |
| 2018/0348374 | A1 | 12/2018 | Laddha et al. |
| 2018/0349746 | A1 | 12/2018 | Vallespi-Gonzalez |
| 2018/0364731 | A1 * | 12/2018 | Liu ........................... G06T 7/50 |

OTHER PUBLICATIONS

Vallespi-Gonzalez et al., U.S. Appl. No. 15/795,632, filed Oct. 27, 2017, Perception Vehicle Heading Regressor.
Chen et al., U.S. Appl. No. 15/886,434, filed Feb. 1, 2018, Improving Resolution of a Free Space Detector.
Vallespi-Gonzalez et al., U.S. Appl. No. 15/972,566, filed May 7, 2018, Two-Stage Image-Based Object Recognition.
Martin et al., U.S. Appl. No. 15/992,498, filed May 30, 2018, Long Range Vehicle Detection.
Vallespi-Gonzalez et al., U.S. Appl. No. 16/020,193, filed Jun. 27, 2018, Polynomial Fit on Predicted Locations.
Vallespi-Gonzalez et al., U.S. Appl. No. 16/038,730, filed Jul. 18, 2018, Learnt Association for Perception.
Kee et al., U.S. Appl. No. 16/038,740, filed Jul. 18, 2018, Variance Regression for Tracking Observed Objects.
Gulino et al., U.S. Appl. No. 16/043,759, filed Jul. 24, 2018, Providing Actionable Uncertainties.

\* cited by examiner

SYSTEM AND METHOD FOR MOVEMENT DETECTION

PRIORITY CLAIM

The present application is a continuation application of U.S. application Ser. No. 16/299,527, having a filing date of Mar. 12, 2019, and which claims the benefit of priority of U.S. Provisional Patent Application No. 62/799,314, filed Jan. 31, 2019, and entitled "Systems and Methods for Detecting an Object Velocity." Applicant claims priority to and the benefit of each of such applications and incorporates all such applications herein by reference in its entirety.

FIELD

The present disclosure relates generally to detecting one or more objects in a scene and a velocity for each detected object.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion plan through such surrounding environment.

SUMMARY

Aspects and advantages of the present disclosure will be set forth in part in the following description, or may be learned from the description, or may be learned through practice of the embodiments.

One example aspect of the present disclosure is directed to a computer-implemented method for object detection. The method includes obtaining, by a computing system including one or more computing devices, image data and range data representing a scene external to an autonomous vehicle, the image data including at least a first image and a second image that depict the scene. The method includes identifying, by the computing system, a set of corresponding image features from the image data, the set of corresponding image features including a first feature in the first image having a correspondence with a second feature in the second image. The method includes determining, by the computing system, a respective distance for each of the first feature in the first image and the second feature in the second image based at least in part on the range data. The method includes determining, by the computing system, a velocity associated with an object represented by the set of corresponding image features based at least in part on the respective distance for the first feature and the respective distance for the second feature.

Another example aspect of the present disclosure is directed to a computing system. The computing system includes one or more processors and one or more tangible, non-transitory, computer readable media that collectively store instructions that when executed by the one or more processors cause the computing system to perform operations. The operations include obtaining image data and range data representing a scene, the image data including at least a first image and a second image that depict one or more objects in the scene. The operations include determining state data based at least in part on the image data and the range data, the state data including at least a first state corresponding to the first image and a second state corresponding to the second image. The operations include determining flow data indicative of a flow between the first state and the second state. The operations include determining position data for the one or more objects based at least in part on the state data and the flow data, the position data including a first position and a second position of the one or more objects.

Yet another example aspect of the present disclosure is directed to an autonomous vehicle. The autonomous vehicle includes one or more processors and one or more tangible, non-transitory, computer readable media that collectively store instructions that when executed by the one or more processors cause the autonomous vehicle to perform operations. The operations include obtaining image data and range data representing a scene external to an autonomous vehicle, the image data including at least a first image and a second image that depict the scene. The operations include identifying a set of corresponding image features from the image data, the set of corresponding image features including a first feature in the first image having a correspondence with a second feature in the second image. The operations include determining a respective distance for each of the first feature in the first image and the second feature in the second image based at least in part on the range data. The operations include determining a velocity associated with an object represented by the set of corresponding image features based at least in part on the respective distance for the first feature and the respective distance for the second feature.

Other example aspects of the present disclosure are directed to systems, methods, vehicles, apparatuses, tangible, non-transitory computer-readable media, and memory devices for detecting a velocity of an object.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth below, which make reference to the appended figures, in which.

Figure 1:
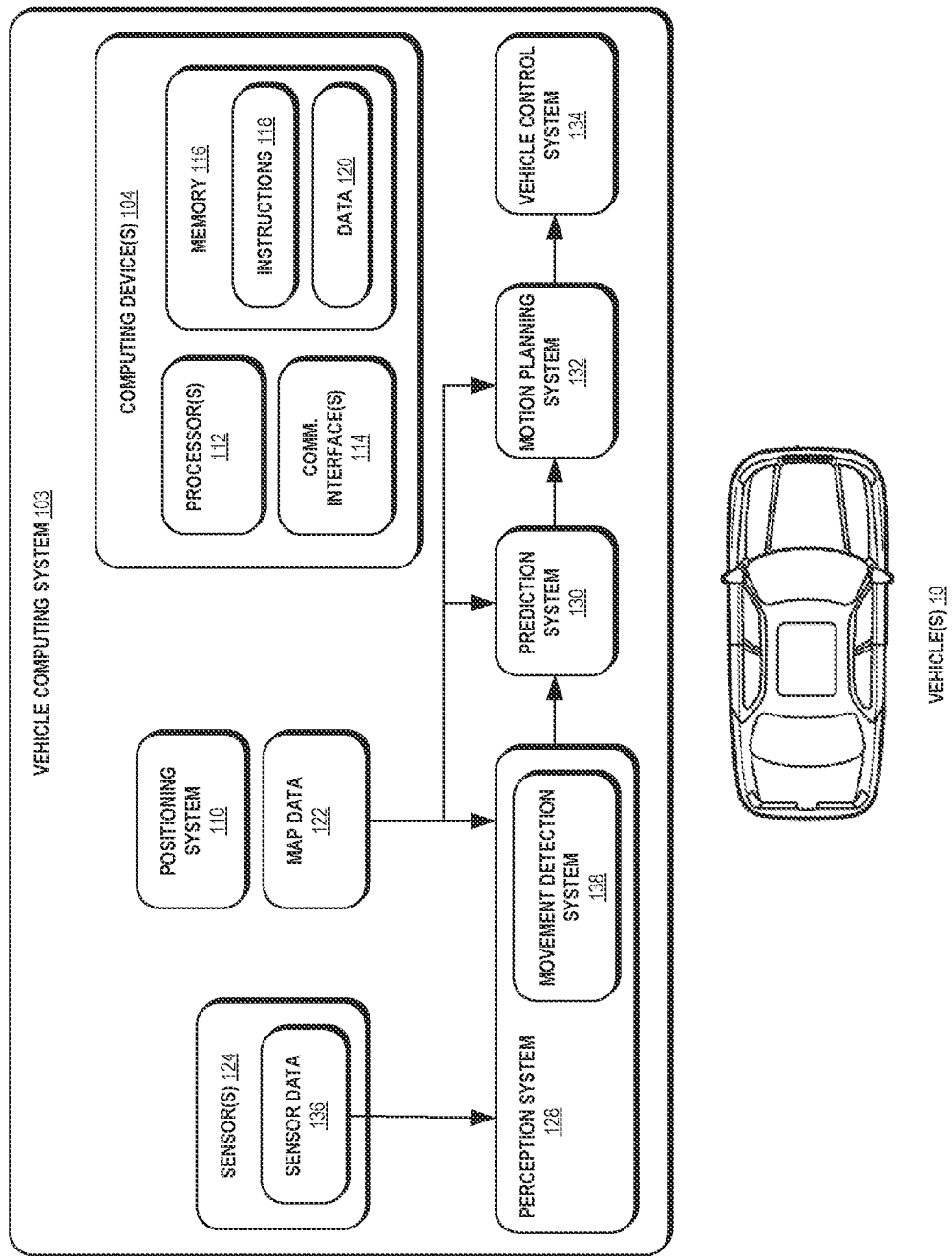
FIG. 1 depicts an example computing system according to example embodiments of the present disclosure.

Reference numerals that are repeated across plural figures are intended to identify the same components or features in various implementations.

DETAILED DESCRIPTION

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are generally directed to detecting a velocity for one or more portions of a scene, based on image data and range data descriptive of the scene. In particular, a movement detection system can be configured to obtain and use the image data in combination with the range data to more accurately detect a position and a velocity for one or more portions of a scene. In this way, systems and methods consistent with the present disclosure can determine the position and velocity for portions of a scene (e.g., an object in the scene) with greater precision than by using the image data and the range data separately. For example, image data obtained from an image sensor can be used to identify changes in tangential motion with high confidence, whereas range data obtained from a range sensor can be used to identify changes in radial motion with high confidence. By utilizing a combination of the image data and the range data, the present disclosure can enable the movement detection system to detect both a tangential and radial motion of portions of a scene. In some examples, the movement detection system can be part of or otherwise supplement an object detection system or perception system of an autonomous vehicle. The movement detection system can detect movements within a scene that may otherwise be overlooked. Movement data can be provided to the object detection system to more accurately determine a position and a velocity for objects depicted in the scene. In some examples, the movement detection system can identify areas of motion which are provided as proposals to the objection detection system.

More particularly, an autonomous vehicle (e.g., ground-based vehicle, etc.) can include various systems and devices configured to control the operation of the vehicle. For example, an autonomous vehicle can include an onboard vehicle computing system (e.g., located on or within the autonomous vehicle) that is configured to operate the autonomous vehicle. Generally, the vehicle computing system can obtain sensor data from a sensor system onboard the vehicle, attempt to comprehend the vehicle's surrounding environment by performing various processing techniques on the sensor data, and generate an appropriate motion plan through the vehicle's surrounding environment.

The sensor system of an autonomous vehicle can include one or more sensors that are coupled to or otherwise included within the autonomous vehicle. As examples, the one or more sensors can include one or more range sensors (e.g., a Light Detection and Ranging (LIDAR) system, a Radio Detection and Ranging (RADAR) system, depth camera system, stereo camera system, etc.), one or more image sensors (e.g., visible spectrum cameras, infrared cameras, etc.), and/or other sensors. The sensor(s) can be configured to collect sensor data that is descriptive of the environment proximate to the sensor(s). For example, the sensor data can include information that describes the location of objects within the surrounding environment of the autonomous vehicle.

In some implementations, the sensor(s) can be configured to collect sensor data including image data. The image data can be generated by one or more of the image sensor(s). The image data can include an image frame captured by the image sensor(s) that depicts a scene of the environment surrounding the autonomous vehicle. The image frame can be processed to extract, for example, information describing the location of objects within the scene of the surrounding environment. The image data can also include a capture time of the image frame indicating when the image frame was captured by the image sensor(s), and sensor-pose data describing a geometry (e.g., a real-world position and/or orientation) of the image sensor(s) when the image frame was captured by the image sensor(s). In some implementations, the sensor system can collect the image data as a plurality of consecutive image frames, each image frame depicting a scene of the environment surrounding the autonomous vehicle at a specific time. As an example, one or more image sensor(s) can capture a first image frame at a first time and a second image frame at a second time. The sensor system can collect first image data including the first image frame captured by the image sensor(s) at the first time and sensor-pose data associated with the image sensor(s) at the first time; and collect second image data including the second image frame captured by the image sensor(s) at the second time and sensor-pose data associated with the image senor(s) at the second time. The first image frame and the second image frame can be captured by the same image sensor(s) or by different image sensor(s). As an example, the sensor system can include a first image sensor configured to capture consecutive image frames at a predetermined interval (e.g., 0.1 seconds) as the autonomous vehicle is navigating a route. The first image sensor can capture a first image frame depicting a scene of the environment surrounding the autonomous vehicle at a first time when the autonomous vehicle is at a first location along the route. The scene depicted by the first image frame can be based on, for example, a position and/or orientation of the first image sensor at the first time, a position and/or orientation of the autonomous vehicle at the first time, and a field-of-view associated with the first image sensor at the first time. The first image sensor can capture a second image frame depicting a scene of the environment surrounding the autonomous vehicle at a second time when the autonomous vehicle is at a second location along the route. The scene depicted by the second image frame can be based on, for example, a position and/or orientation of the first image sensor at the second time, a position and/or orientation of the autonomous vehicle at the second time, and a field-of-view associated with the first image sensor at the second time. In some implementations, if the position and/or orientation of the autonomous vehicle is the same at the first time and the second time, then the first image sensor can capture a first image frame depicting a first scene at the first time and capture a second image frame depicting a second scene at the second time. In this case, the first scene and the second scene can correspond to the same physical location proximate to the autonomous vehicle at the first time and the second time, respectively.

In some implementations, the sensor(s) can be configured to collect sensor data including range data. The range data can be generated by one or more of the range sensor(s). In some implementations, the range data can be obtained using any range sensing modality that can be calibrated to allow for transformation of the range data into a continuous coordinate space corresponding to the surrounding environment of the autonomous vehicle. The range data can be obtained from various sensors such as RADAR sensors, LIDAR sensors, depth cameras, etc. In some examples, the range data can be generated by one or more machine-learned models that can generate range data (e.g., depth estimations) based on monocular (e.g., single) camera images, etc. The range data can include a plurality of points captured by the range sensor(s) that depict a scene of the environment surrounding the autonomous vehicle. The range data can be processed to extract, for example, information describing the location of objects within the scene of the surrounding environment. For example, the range data can include a range value (e.g., distance) associated with one or more of the plurality of points. In some implementations, the range data can include additional information associated with the plurality of points, such as whether a point is interesting. For example, the range data can include a tag associated with each point, the tag indicating whether the point meets an interest-level threshold criteria. The interest-level threshold criteria can include, for example, whether the point corresponds to a pre-determined object (e.g., tree) or pre-determined region (e.g., ground) in the scene. In some implementations, the sensor system can collect the range data as a plurality of consecutive 360 degree scenes and/or a portion thereof (e.g., a slice of a 360 degree scene) at a plurality of cycles. As an example, one or more first range sensor(s) can capture a plurality of points at one or more cycles beginning at a first time and ending at a second time. Each of the plurality of points can be captured at a different time between the first time and the second time. The sensor system can collect range data including the plurality of points that depict one or more 360 degree scenes (corresponding to the one or more cycles) between the first time and the second time.

The onboard vehicle computing system can include hardware that is configured to process the sensor data. For example, for implementations including an autonomous vehicle, the onboard vehicle computing system can include a movement detection system (e.g., as at least a portion of the vehicle's autonomy system). In some implementations, the movement detection system can be configured to receive image data that is output by one or more image sensor(s) (e.g., cameras) and range data that is output by one or more range sensor(s) (e.g., LIDAR).

In some implementations, the movement detection system can include a sensor data synchronizer that is configured to synchronize the image data and range data, and determine synchronized sensor data. The synchronized sensor data can describe at least a portion of the range data which corresponds to a scene depicted in the image data. In particular, the sensor data synchronizer can identify one or more of the plurality of points in the range data that meet a temporal proximity threshold criteria with respect to an image frame in the image data. The one or more identified points for each scene can be determined as being close in time to a capture time of the image frame depicting the scene. As an example, one or more first range sensors can be configured to capture a plurality of points depicting a 360 degree scene that is aligned with the center of an image sensor. When the image sensor captures an image frame at a current time, the first range sensor(s) can capture a plurality of points at a current cycle beginning at the current time. In this case, one or more points captured by the first range sensor(s) near the end of a previous cycle can be closer in time to the capture time of the current image frame (e.g., the current time) than one or more points captured by the first range sensor(s) near the end of the current cycle. Accordingly, the sensor data synchronizer can determine synchronized sensor data including one or more points from the plurality of points in the range data synchronized with the image frame depicting the scene in the image data. In particular, the synchronized sensor data can include a plurality of points captured near the end of the previous cycle and/or captured near the beginning of the current cycle. As another example, the movement detection system can receive first image data, second image data, and range data. The sensor data synchronizer can determine synchronized sensor data including one or more points from the plurality of points in the range data synchronized with each of a first image frame in the first image data and a second image frame in the second image data. In particular, the synchronized sensor data can include a plurality of first points from the range data that meet a temporal proximity threshold criteria with respect to a capture time of the first image frame, and a plurality of second points from the range data that meet a temporal proximity threshold criteria with respect to a capture time of the second image frame.

In some implementations, the movement detection system can include a state manager that can be configured to determine state data that describes a state of a scene at a specific time. As an example, the state data for a scene can include image data corresponding to the scene (e.g., an image frame depicting the scene, a capture time when the image frame was captured by one or more image sensors, and sensor-pose data associated with the one or more image sensors at the capture time) and synchronized range data associated with the image data (e.g., a subset of the range data that meet a temporal proximity threshold criteria with respect to the capture time of the image frame depicting the scene). In some implementations, the state data for a scene can include range map data, interesting range data, and keypoint data associated with the image data and synchronized range data. As an example, the state manager can determine range map data associated with an image frame in the image data based at least in part on the synchronized range data. The range map data can describe a mapping of one or more points in the synchronized range data to a continuous coordinate space corresponding to the surrounding environment of the autonomous vehicle. As another example, the state manager can determine interesting range data including one or more points in the synchronized range data based at least in part on an interest level associated with the point(s) (e.g., based at least in part on a tag associated with each point). As another example, the state manager can determine keypoint data by generating a plurality of keypoints based at least in part on the image frame in the image data. The keypoint data can describe, for example, one or more pixels in the image frame that meet an appearance threshold criteria. In some implementations, the state manager can exclude one or more of the plurality of keypoints from the keypoint data, based at least in part on the interesting range data. For example, if a keypoint (e.g., one or more pixels in the image frame that meet an appearance threshold criteria) corresponds to a point in the synchronized range data that does not meet an interest-level threshold criteria, then the state manager can exclude the keypoint from the keypoint data. In some implementations, the state manager can generate the plurality of keypoints based on a texture criteria, such as, for example a Features from Accelerated Segment Test (FAST). In some implementations, the state manager can input the image frame in the image data into a machine-learned keypoint generation model, and in response obtain an output of the machine-learned keypoint generation model including the plurality of keypoints. In some implementations, the state manager can determine keypoint data over a range from a plurality of sparse keypoints to a dense optical flow. If the state manager determines keypoint data including a plurality of sparse keypoints, then the movement detection system can perform sparse keypoint matching based on the keypoint data, as described in more detail below. If the state manager determines keypoint data including a dense optical flow, then the movement detection system can perform dense optical flow matching based on the keypoint data, as described in more detail below.

In some implementations, the state manager can determine state data including current state data and previous state data. The current state data can describe a state of a scene at a current time and the previous state data can describe a state of a scene at a previous time. As an example, the movement detection system can receive first image data, second image data, and range data; and the sensor data synchronizer can determine first synchronized range data associated with the first image data and second synchronized range data associated with the second image data. If a capture time of an image frame in the first image data is at time t=1, and a capture time of an image frame in the second image data is at time t=2, then the state manager can determine current state data based on the most recently captured image frame. In particular, the state manager can determine the current state data based on the second image data and second synchronized range data, and determine previous state data based on the first image data and first synchronized range data. As another example, if the capture time of the image frame in the first image data is at time t and the capture time of the image frame and the second image data is at time t-x. Then the state manager can determine current state data based on the first image data and associated synchronized range data, and determine previous state data based on the second image data and associated synchronized range data.

In some implementations, the state manager can determine state data that describes a plurality of states. As an example, the movement detection system can receive first image data, second image data, third image data, and range data. The movement detection system can determine current state data based on the most recently captured image frame in the first, second, or third image data, determine first previous state data based on a second most recently captured image frame in the first, second, or third image data, and determine second previous state data based on a third most recently captured image frame in the first, second, or third image data. The current state data can describe a state of a scene at a current time, the first previous state data can describe a state of a scene at a first previous time, and the second previous state data can describe a state of a scene at a second previous time. As another example, the state data can include the current state data and a plurality of previous state data that describes a state of a scene at a plurality of different times. By using multiple image frames, the movement detection system can yield more accurate results and/or increase a confidence level of a detected position/velocity for one or more portions of scene and/or one or more objects in the scene.

In some implementations, the state manager can determine the previous state data based at least in part on previously determined state data. As an example, at a first iteration, the state manager can obtain image data including a first image frame captured at time t=1 and a second image frame captured at time t=2. For the first iteration, the state manager can determine previous state data based on the first image frame and current state data based on the second image frame. At a second iteration, the state manager can obtain image data including a third image frame captured at time t=3. For the second iteration, the state manager can determine previous state data based on the state data previously determined for the first iteration (e.g., the state data based on the second image frame) and determine current state data based on the third image frame. As another example, at a third iteration, the state manager can obtain image data including a third image frame captured at time t=3. For the third iteration, the state manager can determine previous state data based on the state data previously determined for a second iteration. Alternatively, for the third iteration, the state manager can determine first previous state data based on the state data previously determined for the second iteration, and determine second previous state data based on the state data previously determined for a first iteration. In this way, the state manager can determine a plurality of previous state data based at least in part on a plurality of previously determined state data.

In some implementations, the movement detection system can include a flow computation unit that is configured to determine flow data indicative of a flow between a state of a scene at a previous time (e.g., previous state data) and a state of a scene at a current time (e.g., current state data). The flow data can include matched-feature data and point-resolution data. The matched-feature data can include of one or more matching image features between a previous image frame (e.g., an image frame in the previous state data) and a current image frame (e.g., an image frame in the current state data). For example, the flow computation unit can extract a first set of image features based at least in part on the previous image frame and keypoint data associated with the previous image frame (e.g., keypoint data in the previous state data), and extract a second set of image features based at least in part on the current image frame and keypoint data associated with the current image frame (e.g., keypoint data in the current state data). The first set of image features can describe one or more pixels in the previous image frame that represent one or more portions of a scene depicted by the previous image frame (e.g., one or more objects in the scene depicted by the previous image frame), and the second set of image features can describe one or more pixels in the current image frame that represent one or more portions of a scene depicted by the current image frame (e.g., one or more objects in the scene depicted by the current image frame). The flow computation unit can determine the matched-feature data based on one or more image features in the first set that match one or more image features in the second set. For example, if the keypoint data includes a plurality of sparse keypoints, then the flow computation unit can perform sparse keypoint matching to determine the matched-feature data. Alternatively, if the keypoint data includes a dense optical flow, then the flow computation unit can perform dense optical flow matching to determine the matched-feature data. In this way, the flow computation unit can determine one or more first pixels in the previous image frame that represent the same object as one or more second pixels in the current image frame. In some implementations, the matched-feature data can include one or more matching features between a current image frame (e.g., an image frame in the current state data) and a plurality of previous image frames (e.g., a plurality of image frames in the plurality of previous state data). For example, the flow computation unit can extract a set of image features for each image frame (e.g., the current image frame, the plurality of previous image frames), and determine the matched-feature data based on one or more matching image features from the plurality of sets of image features. In this way, the flow computation unit can determine one or more pixels in each of a plurality of image frames that represent the same object. In some implementations, the flow computation unit can input the state data into a machine-learned feature matching model, and in response obtain an output of the machine-learned feature matching model including the matched-feature data.

The point-resolution data can include a depth value associated with the one or more first pixels and a depth value associated with the one or more second pixels. For example, the flow computation unit can determine a range value associated with each of the one or more first pixels based at least in part on synchronized range data (e.g., the range map data in the previous state data) and sensor-pose data associated with the previous image frame. Similarly, the flow computation unit can determine a range value associated with each of the one or more second pixels based at least in part on synchronized range data (e.g., range map data in the current state data) and sensor-pose data associated with the current image frame. In some implementations, the point-resolution data can describe a three-dimensional position (e.g., horizontal location, vertical location, and distance) of the one or more first pixels and a three-dimensional position (e.g., horizontal location, vertical location, and distance) of the one or more second pixels in the continuous coordinate space corresponding to the surrounding environment of the autonomous vehicle. In this way, the flow computation unit can determine a range value associated with each of one or more pixels in each of a plurality of image frames, based at least in part on synchronized range data and sensor-pose data associated with the image frame. In some implementations, the flow computation unit can input the state data and the matched-feature data into a machine-learned point resolution model, and in response obtain an output of the machine-learned point resolution model including the point-resolution data.

In some implementations, the movement detection system can include an observation formulation unit that is configured to determine a velocity associated with one or more portions of a scene (e.g., one or more objects) described by the matched-feature data. As an example, the observation formulation unit can compare a previous three-dimensional position assigned to a pixel in a previous image frame (e.g., a pixel that represents a portion of a scene depicted by the previous image frame) and a current three-dimensional position of a pixel in a current image frame (e.g., a pixel that represents a portion of a scene depicted by the current image frame) in the continuous coordinate space corresponding to the surrounding environment of the autonomous vehicle. The observation formulation unit can determine a three-dimensional position of a pixel in an image frame (e.g., current image frame, first previous image frame, second previous image frame, etc.) based at least in part on the point-resolution data associated with the image frame in the state data (e.g., current state data, first previous state data, second previous state data, etc.). The observation formulation unit can determine a Cartesian velocity associated with a portion of a scene (e.g., the portion of the scene depicted by the current image frame) based on the comparison. In some implementations, the observation formulation unit can compare a previous position and a current position for each of one or more pixels that represent a portion of a scene (e.g., the portion of the scene depicted by the current image frame). For example, the observation formulation unit can determine that a first image feature of a current image frame is associated with a first pixel and a second pixel in the current image frame (e.g., a portion of a scene depicted by the current image frame). The observation formulation unit can determine (e.g., based on the matched-feature data) a third pixel and a fourth pixel in a previous image frame (e.g., a portion of a scene depicted by the previous image frame) that correspond to the first pixel and the second pixel, respectively, and are associated with a matching image feature of the previous image frame. The observation formulation unit can compare a respective three-dimensional position corresponding to the first and third pixels (e.g., based on the point-resolution data) to determine a Cartesian velocity associated with the first pixel; and compare a respective three-dimensional position corresponding to the second and fourth pixels (e.g., based on the point-resolution data) to determine a Cartesian velocity associated with the second pixel. The observation formulation unit can average the Cartesian velocities associated with the first and second pixels to determine a Cartesian velocity associated with the portion of the scene represented by the first and second pixels that are depicted by the current image frame and correspond to the first image feature.

In some implementations, the observation formulation unit can determine a Cartesian velocity associated with a portion of a scene depicted by a current image frame based on a comparison between the current image frame and a first previous image frame; and determine a Cartesian velocity associated with a portion of a scene depicted by the first previous image frame based on a comparison between the first previous image frame and a second previous image frame. In some implementations, the observation formulation unit can determine a Cartesian velocity associated with a portion of a scene depicted by a current image frame based on a comparison between the current image frame and a plurality of previous image frames. By using multiple image frames, the observation formulation unit can yield more accurate results and/or increase a confidence level of a detected position/velocity for the one or more portions of a scene. In this way, the observation formulation unit can determine a velocity associated with each of one or more portions of scene depicted by one or more image frames.

As another example, the observation formulation unit can determine a relative position of a portion of a scene (e.g., an object in the scene) with respect to one or more image sensors. In some implementations, the observation formulation unit can determine an angle and a range for a portion of a scene depicted by an image frame (e.g., an object in the scene depicted by the image frame) with respect to a center of an image sensor used to capture the image frame. As an example, the observation formulation unit can determine one or more pixels in an image frame that represent a portion of a scene depicted by the image frame (e.g., one or more pixels associated with an image feature in the image frame). The observation formulation unit can determine, for each of the one or more pixels, an angle and a range with respect to a center of an image sensor used to capture the image frame. In some implementations, the observation formulation unit can combine an angle and a range associated with each of the one or more pixels to determine an angle and a range for the portion of the scene represented by the one or more pixels. As another example, the observation formulation unit can determine that a first image feature of a current image frame is associated with a first pixel and a second pixel in the current image frame (e.g., a portion of a scene depicted by the current image frame). The observation formulation unit can determine (e.g., based on the matched-feature data) a third pixel and a fourth pixel in a previous image frame (e.g., a portion of a scene depicted by the previous image frame) that correspond to the first pixel and the second pixel, respectively, and are associated with a matching image feature of the previous image frame. The observation formulation unit can determine a previous angle and a previous range for the portion of the scene depicted by the previous image frame (e.g., for each of the third and fourth pixels) with respect to the center of an image sensor used to capture the previous image frame; and determine a current angle and a current range for the portion of the scene depicted by the current image frame (e.g., for each of the first and second pixels) with respect to the center of an image sensor used to capture the current image frame. The observation formulation unit can compare the previous angle and previous range with the current angle and current range to determine a velocity associated with the portion of the scene depicted by the current image frame. Alternatively, the observation formulation unit can provide data indicative of the previous position (e.g., previous angle and previous range) and the current position (e.g., current angle and current range) to one or more other systems (e.g., an object tracking system) for further processing (e.g., determining a velocity for an object corresponding to the portion of the scene depicted by the current image frame and/or tracking the object).

In some implementations, the movement detection system can include a verification unit that is configured to verify a determined velocity for one or more portions of a scene (e.g., one or more objects in the scene). As an example, the verification unit can compare the determined velocity against velocity threshold criteria, such as, for example, whether the velocity is below a predetermined velocity value (e.g., below 25 m/s). If the velocity meets the velocity threshold criteria, then the verification unit can provide the determined velocity associated with a portion of a scene (e.g., an object in the scene) to an object tracking system.

In some implementations, the movement detection system can include a clean-up unit that is configured to perform clean-up operations subsequent to verifying one or more velocities determined for one or more portions of a scene (e.g., one or more objects in the scene). In particular, the verification unit can determine diagnostics data associated with determining the one or more velocities, and provide the diagnostics data to the clean-up unit. The clean-up unit can analyze the diagnostics data to determine if one or more errors occurred when determining the one or more velocities based on the image data and the range data. As an example, if the clean-up unit determines that one or more errors had occurred (e.g., unable to get confident range on a point), then the clean-up unit can clear a processing pipeline of the movement detection system. As another example, if the clean-up unit determines that no errors occurred, then the clean-up unit can provide the state data for the current iteration to the state manager for use during a next iteration. In some implementations, the clean-up unit can provide the diagnostics data to one or more other systems for further analysis/processing, or output the diagnostics data for a developer to debug/improve for further improvement of the movement detection system.

The systems and methods described herein may provide a number of technical effects and benefits. For instance, movement detection systems and methods that implement movement detection using image sensor data in combination with range sensor data can provide more accurate movement detection and can be used to reduce false positives or false negatives associated with an object detection system. In particular, the systems and methods leverage the relative strengths of image data from an image sensor and range data from a range sensor with respect to each other, and use the sensor in a more efficient manner to detect and determine a position and/or velocity for one or more portions of a scene (e.g., one or more objects in the scene). In addition, the systems and methods can provide data indicative of the determined position and/or velocity relative to one or more sensors (e.g., relative to a center of an image sensor) such that the data resembles sensor data directly output by the one or more sensors (e.g., image sensor data output by an image sensor, LIDAR sensor data output by a LIDAR sensor, RADAR sensor data output by a RADAR sensor, etc.). In this way, the movement detection system can feed its output to an object tracking system which can utilize the output to track objects in combination with or supplemental to other tracking data (e.g., RADAR sensor data output by a RADAR sensor) used by the object tracking system. For example, if the other tracking data includes one or more false negatives, then the movement detection system can determine one or more areas of interest based on a position and/or velocity determined by the movement detection system. The movement detection system can provide data indicative of the one or more areas of interest to the object tracking system as a form of fail-safe with respect to the one or more false negatives.

According to some implementations, the disclosed technology may provide a particular benefit for movement detection and/or movement prediction in autonomous vehicles. For example, the use of image data to determine a velocity of objects may result in earlier detections of object movement. LIDAR data, for example, can be sparse such that objects at a considerable distance from the sensor may only have a relatively few number of LIDAR points associated with them. In such examples, object movement, particularly for objects at a large distance from the autonomous vehicle, may go undetected by using LIDAR data alone. By incorporating image data as described herein, earlier detections of movement may be possible. In particular, LIDAR or other range data may be utilized along with the image data to more accurately determine a velocity of objects at a large distance from the autonomous vehicle. Such combinations may improve safety by providing earlier detections of object and object movement to the autonomous computing system. In particular, the utilization of image data may provide for more accurate detection of tangential velocities relative to the direction of the autonomous vehicle movement. According to some implementations, the disclosed technology may provide a particular benefit for object detection and/or object prediction for any actor operating in an environment and configured to include the movement detection system described herein.

With reference now to the FIGS., example embodiments of the present disclosure will be discussed in further detail.

FIG. 1 depicts an example computing system according to example embodiments of the present disclosure. The computing system illustrated in FIG. 1 is provided as an example only. The components, systems, connections, and/or other aspects illustrated in FIG. 1 are optional and are provided as examples of what is possible, but not required, to implement the present disclosure. The computing system can include one or more vehicles 10. Vehicle(s) 10 can be a ground-based autonomous vehicle (e.g., car, truck, bus), an air-based autonomous vehicle (e.g., airplane, drone, helicopter, or other aircraft), an autonomous light electric vehicle (e.g., bike, scooter, etc.), or other types of vehicles (e.g., boat, ship, or other watercraft). Vehicle(s) 10 can be an autonomous vehicle that can drive, navigate, operate, etc. with minimal and/or no interaction from a human driver, or vehicle(s) 10 can be manually controlled by a human operator. Vehicle(s) 10 can each be associated with a vehicle computing system 103.

Vehicle(s) 10 can be capable of sensing its environment, navigating its environment with minimal or no human input, and/or the like. Vehicle(s) 10 can include a vehicle computing system 103. Computing system 103 can assist in controlling vehicle(s) 10. For example, computing system 103 can receive data generated by one or more sensors 124, attempt to comprehend an environment at least partially surrounding vehicle(s) 10 by performing various processing techniques on the data generated by sensor(s) 124, generate a motion plan for navigating vehicle(s) 10 through such surrounding environment. Computing system 103 can interface with one or more vehicle controls to operate vehicle(s) 10 (e.g., in accordance with the motion plan, and/or the like).

Computing system 103 can include one or more computing devices 104. Computing device(s) 104 can include circuitry configured to perform one or more operations, functions, and/or the like described herein. For example, computing device(s) 104 can include one or more processor(s) 112, one or more communication interfaces 114, and memory 116 (e.g., one or more hardware components for storing executable instructions, data, and/or the like). Communication interface(s) 114 can enable computing device(s) 104 to communicate with one another, and/or can enable vehicle(s) 10 (e.g., computing system 103, computing device(s) 104, and/or the like) to communicate with one or more computing systems, computing devices, and/or the like distinct from vehicle(s) 10. Memory 116 can include (e.g., store, and/or the like) instructions 118 and data 120. When executed by processor(s) 112, instructions 118 can cause vehicle(s) 10 (e.g., computing system 103, computing device(s) 104, and/or the like) to perform one or more operations, functions, and/or the like described herein. Data 120 can include, represent, and/or the like information associated with such operations, functions, and/or the like, and data generated by sensor(s) 124, and/or the like.

Sensor(s) 124 can include, for example, one or more cameras (e.g., visible spectrum cameras, infrared cameras, and/or the like), light detection and ranging (LIDAR) systems, radio detection and ranging (RADAR) systems, and/or the like. Sensor(s) 124 can generate sensor data 136 that is descriptive of the environment proximate to the sensor(s) 124; including information that describes one or more locations, velocities, vectors, and/or the like of portion of a scene and/or objects in the environment surrounding vehicle(s) 10. For example, a LIDAR system can generate data indicating the relative location (e.g., in three-dimensional space relative to the LIDAR system, and/or the like) of a number of points corresponding to objects that have reflected a ranging laser of the LIDAR system. Such a LIDAR system can, for example, measure distances by measuring the interference between outgoing and incoming light waves, measure the time of flight (TOF) it takes a short laser pulse to travel from a sensor to an object and back, calculate the distance based at least in part on the TOF with respect to the known speed of light, based at least in part on a phase-shift with known wavelength, and/or the like. As another example, a RADAR system can generate data indicating one or more relative locations (e.g., in three-dimensional space relative to the RADAR system, and/or the like) of a number of points corresponding to objects that have reflected a ranging radio wave of the RADAR system. For example, radio waves (e.g., pulsed, continuous, and/or the like) transmitted by such a RADAR system can reflect off an object and return to a receiver of the RADAR system, generating data from which information about the object's location, speed, and/or the like can be determined. As another example, for one or more cameras, various processing techniques, for example, range-imaging techniques (e.g., structure from motion, structured light, stereo triangulation, and/or the like) can be performed to identify one or more locations (e.g., in three-dimensional space relative to the camera(s), and/or the like) of a number of points corresponding to objects depicted in imagery captured by the camera(s). Other sensor systems can identify the location of points that correspond to objects as well. Thus, the sensor(s) 124 can be used to collect sensor data 136 that includes information that describes the location (e.g., in three-dimensional space relative to the autonomous vehicle 10) of points that correspond to objects within the surrounding environment of the vehicle(s) 10.

Figure 2:
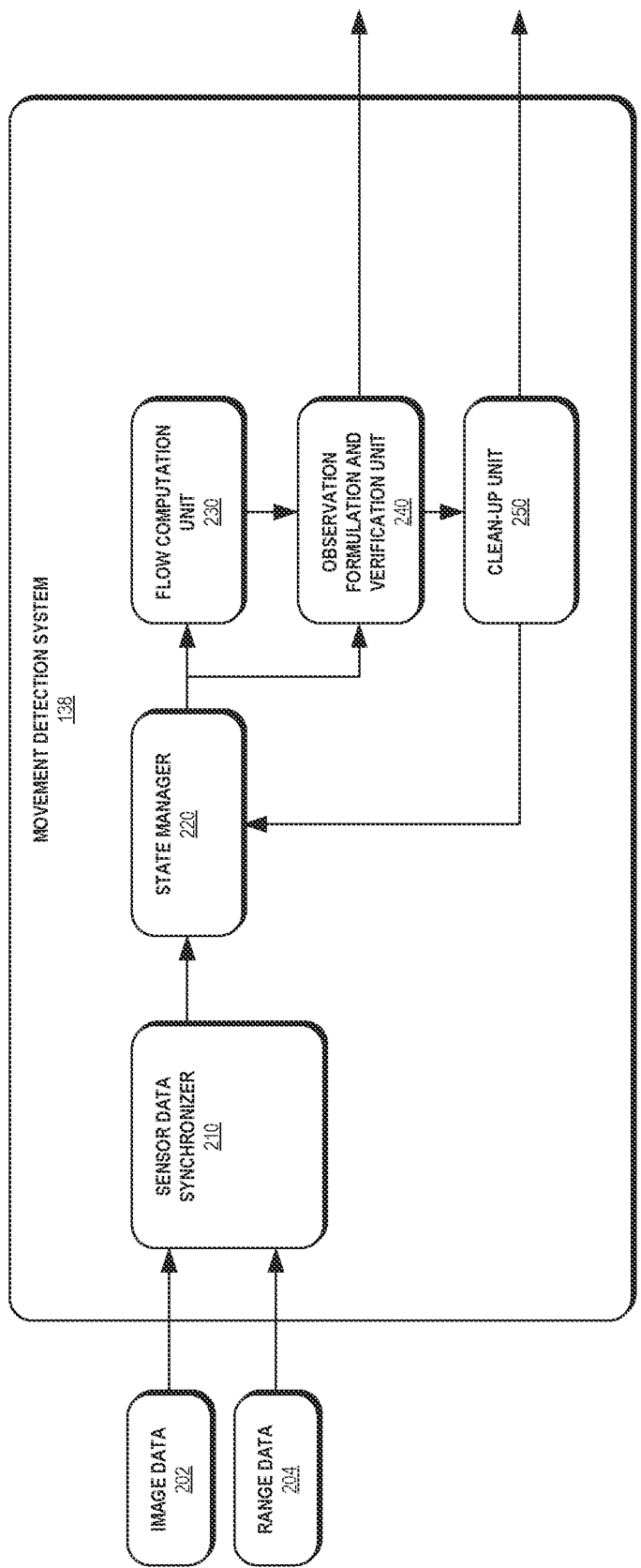
FIG. 2 depicts an example movement detection system according to example embodiments of the present disclosure.

In some implementations, sensor(s) 124 can be used to collect sensor data 136 including image data 202 and range data 204 (shown in FIG. 2). Image data 202 can be generated by, for example, one or more image sensors (e.g., one or more cameras). Range data 204 can be generated by, for example, one or more range sensors (e.g., one or more LIDAR systems). In some implementations, sensor(s) 124 can provide sensor data 136 including image data 202 and range data 204 to perception system 128, and in particular, to the movement detection system 138.

Positioning system 110 can determine a current position of the vehicle 10. The positioning system 110 can be any device or circuitry for analyzing the position of the vehicle(s) 10. For example, the positioning system 110 can determine position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle(s) 10 can be used by various systems of the computing system 103.

In addition to the sensor data 136, perception system 128 can retrieve or otherwise obtain map data 122 that provides detailed information about the surrounding environment of the vehicle(s) 10. The map data 122 can provide information regarding: the identity and location of different travel ways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way); traffic control data (e.g., the location and instructions of signage, traffic lights, or other traffic control devices); and/or any other map data that provides information that assists the computing system 103 in comprehending and perceiving its surrounding environment and its relationship thereto.

The perception system 128 can identify one or more objects that are proximate to the vehicle(s) 10 based on sensor data 136 received from the sensor(s) 124 and/or the map data 122. In particular, in some implementations, the perception system 128 can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information. In some implementations, the perception system 128 can include movement detection system 138. The movement detection system 138 can be configured to detect movements within a scene, such as, for example, a position and/or velocity associated with one or more portions of the scene (e.g., one or more objects in the scene) that may otherwise be overlooked. The perception system 128 can determine state data for each object over a number of iterations. In particular, the perception system 128 can update the state data for each object at each iteration. Thus, the perception system 128 can detect and track objects (e.g., obstacles, hazards, other vehicles, etc.) that are proximate to the vehicle(s) 10 over time.

Prediction system 130 can receive the state data from the perception system 128 and predict one or more future locations for each object based on such state data. For example, the prediction system 130 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

Motion-planning system 132 can generate, determine, select, and/or the like a motion plan for vehicle(s) 10, for example, based at least in part on state data of object(s) provided by perception system 128, predicted future location(s) of object(s) provided by prediction system 130, and/or the like. For example, utilizing information about current location(s) of object(s), predicted future location(s) of object(s), and/or the like, motion-planning system 132 can generate, determine, select, and/or the like a motion plan for vehicle(s) 10 that it determines (e.g., based at least in part on one or more operation parameters, and/or the like) best navigates vehicle(s) 10 relative to the object(s). Motion-planning system 132 can provide the motion plan to vehicle control system 134, which can directly and/or indirectly control vehicle(s) 10 via the one or more vehicle controls (e.g., one or more actuators, devices, and/or the like that control gas, power flow, steering, braking, and/or the like) in accordance with the motion plan.

Perception system 128, prediction system 130, motion-planning system 132, and/or vehicle control system 134 can include logic utilized to provide functionality described herein. Perception system 128, prediction system 130, motion-planning system 132, and/or vehicle control system 134 can be implemented in hardware (e.g., circuitry, and/or the like), firmware, software configured to control one or more processors, one or more combinations thereof, and/or the like. For example, instructions 118, when executed by processor(s) 112, can cause vehicle(s) 10 (e.g., computing system 102, computing device(s) 104, and/or the like) to implement functionality of perception system 128, prediction system 130, motion-planning system 132, and/or vehicle-control system 134 described herein.

As shown in FIG. 2, the movement detection system 138 can additionally include sensor data synchronizer 210, state manager 220, flow computation unit 230, observation formulation and verification unit 240, and clean-up unit 250.

Movement detection system 138 can obtain sensor data 136 including image data 202 and range data 204. Image data 204 can include an image frame captured by one or more image sensors (e.g., one or more cameras). The image frame can depict a scene of the environment surrounding vehicle 10. In some implementations, image data 202 can include a capture time of the image frame indicating when the image frame was captured by the image sensor(s), and sensor-pose data describing a geometry (e.g., a real-world position and/or orientation) of the image sensor(s) at the capture time. In some implementations, image data 202 can include previous image data and current image data. The previous image data can include a previous image frame captured by one or more image sensors at a previous time that depicts a scene of the environment surrounding vehicle 10, and sensor-pose data describing a geometry of the image sensor(s) when the previous image frame was captured. The current image data can include a current image frame captured by one or more image sensors at a current time that depicts a scene of the environment surrounding vehicle 10, and sensor-pose data describing a geometry of the image sensor(s) when the current image frame was captured. Range data 204 can include a plurality of points captured by one or more range sensors at one or more cycles that depict one or more 360 degree scenes (and/or a portion thereof) of the environment surrounding vehicle 10. As an example, range data 204 can include a range value (e.g., distance) associated with one or more of the plurality of points. As another example, range data 204 can include a tag associated with each point, the tag indicating whether the point meets an interest-level threshold criteria.

In some implementations, movement detection system 138 can receive image data 202 and range data 204 at sensor data synchronizer 210. Sensor data synchronizer 210 can be configured to synchronize image data 202 and range data 204, and determine synchronized sensor data. In particular, sensor data synchronizer 210 can identify one or more points from the plurality of points in range data 204 that meet a temporal proximity threshold criteria with respect to an image frame in image data 202. As an example, if image data 202 includes an image frame captured at a first time, then sensor data synchronizer 210 can determine synchronized range data 304 (shown in FIG. 3) that includes a subset of the plurality of points in range data 204, each point in the subset satisfying a temporal proximity threshold criteria with respect to the image frame captured at the first time. As another example, if image data 202 includes previous image data and current image data, then sensor data synchronizer 210 can determine synchronized range data 304 that includes a first subset and a second subset of the plurality of points in range data 204. The first subset of points in synchronized range data 304 can be associated with the previous image data, and the second subset of points in synchronized range data 304 can be associated with the current image data. Sensor data synchronizer 210 can determine the first subset based on one or more points in range data 204 that meet a temporal proximity threshold criteria with respect to a capture time of the previous image frame (e.g., previous capture time) in the previous image data. Similarly, sensor data synchronizer can determine the second subset based on one or more points in range data 204 that meet a temporal proximity threshold criteria with respect to a capture time of the current image frame (e.g., current capture time) in the current image data.

State manager 220 can be configured to determine state data 402 (shown in FIG. 4) that describes a state of a scene at a specific time. In some implementations, state manager 220 can determine state data 402 including current state data that describes a state of a scene at a current time (e.g., based on current image data in image data 202) and previous state data that describes a state of a scene at a previous time (e.g., based on previous image data in image data 202). State manager 220 is described in more detail below with regard to FIG. 3. Flow computation unit 230 can be configured to determine flow data indicative of a flow between a state of a scene at a previous time (e.g., previous state data) and a state of a scene at a current time (e.g., current state data). The flow data can include matched-feature data 502 (shown in FIG. 5) and point-resolution data 504 (shown in FIG. 5). Flow computation unit 230 is described in more detail below with regard to FIG. 4. Observation formulation and verification unit 240 can be configured to determine a velocity associated with one or more portions of one or more scenes (e.g., one or more objects in the one or more scenes) described by matched-feature data 502, based in part on point-resolution data 504, and verify the velocity determined for the one or more portions (e.g., one or more objects). Observation formulation and verification unit 240 is described in more detail below with regard to FIG. 4. Clean-up unit 250 can be configured to perform clean-up operations subsequent to verifying the one or more determined velocities. Clean-up unit 250 is described in more detail below with regard to FIG. 4.

Figure 3:
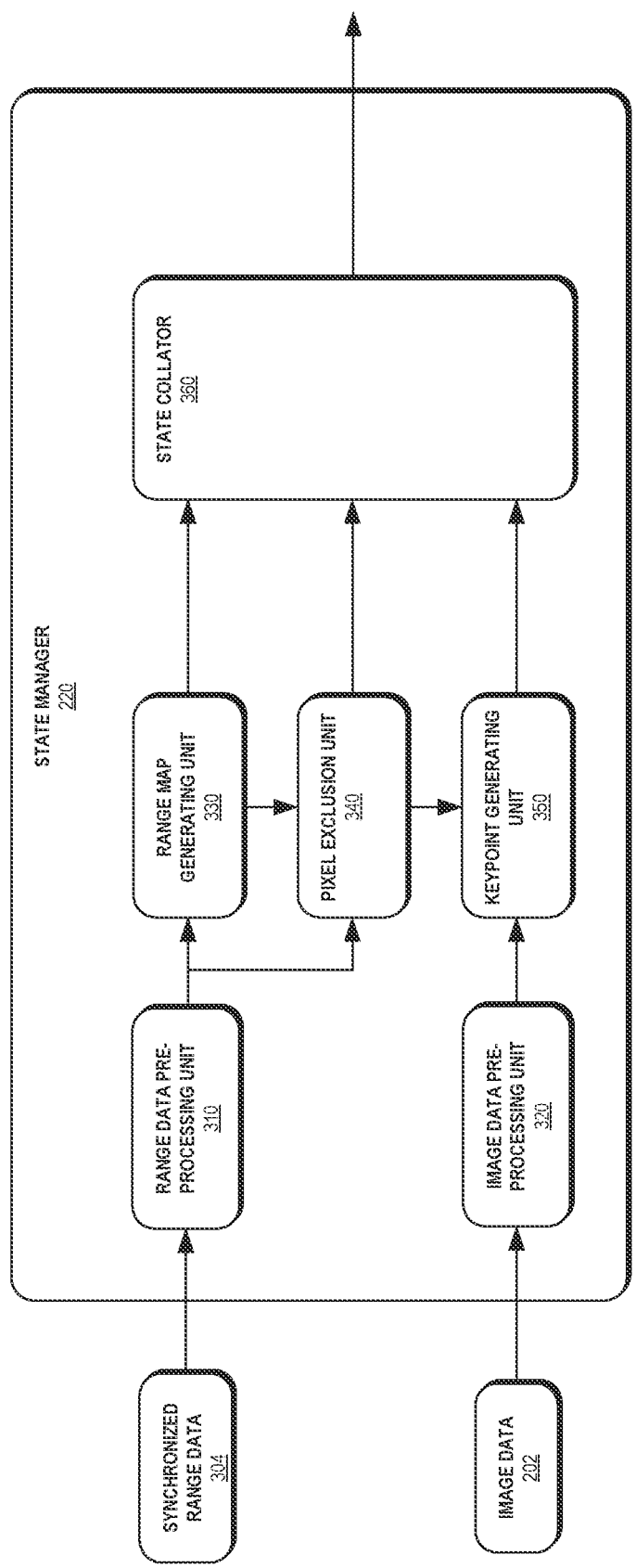
FIG. 3 depicts an example state manager of the movement detection system according to example embodiments of the present disclosure.

As shown in FIG. 3, state manager 220 can additionally include range data pre-processing unit 310, image data pre-processing unit 320, range map generating unit 330, pixel exclusion unit 340, keypoint generating unit 350, and state collator 360. In some implementations, range data pre-processing unit 310 can pre-process synchronized range data 304 for further processing by state manager 220 (e.g., range map generating unit 330, pixel exclusion unit 340, etc.), and/or image data pre-processing unit 320 can pre-process image data 202 for further processing by state manager 220 (e.g., keypoint generating unit 350, etc.).

Range map generating unit 330 can be configured to determine range map data associated with image data 202 and synchronized range data 304. The range map data can describe a mapping of one or more points in synchronized range data 304 to a continuous coordinate space corresponding to the surrounding environment of the vehicle 10. As an example, if image data 202 includes an image frame, then range map generating unit 330 can determine range map data including a range map that maps one or more points in synchronized range data 304 to a continuous coordinate space. As another example, if image data 202 includes previous image data and current image data, then range map generating unit 330 can determine range map data including a previous range map and a current range map. The previous range map can map one or more points in synchronized range data 304 that are associated with the previous image data (e.g., the first subset of points) to a continuous coordinate space, and the current range map can map one or more points in synchronized range data 304 that are associated with the current image data (e.g., the second subset of points) to the continuous coordinate space.

Pixel exclusion unit 340 can be configured to determine one or more pixels to exclude from keypoint data associated with image data 202. In some implementations, pixel exclusion unit 340 can determine interesting range data including one or more points in synchronized range data 304 that meets an interest-level threshold criteria. As an example, if image data 202 includes an image frame, then pixel exclusion unit 340 can determine interesting range data associated with image data 202 that includes one or more points from synchronized range data 304 that meet an interest-level threshold criteria. As another example, if image data 202 includes previous image data and current image data, then pixel exclusion unit 340 can determine previous interesting range data associated with the previous image data, and determine current interesting range data associated with the current image data. The previous interesting range data can include one or more points in synchronized range data 304 that are associated with the previous image data (e.g., the first subset of points) and meet an interest-level threshold criteria. The current interesting range data can include one or more points in synchronized range data 304 that are associated with the current image data (e.g., the second subset of points) and meet an interest-level threshold criteria. In some implementations, movement detection system 138 can determine to further process one or more pixels in image data 202 that correspond to the points in the interesting range data associated with image data 202, and/or determine to exclude one or more pixels in image data 202 that do not correspond to the points in the interesting range data from further processing. For example, keypoint generating unit 350 can determine to exclude one or more keypoints based on the interesting range data as will be described in more detail below.

Keypoint generating unit 350 can be configured to determine keypoint data including a plurality of keypoints based on an image frame in image data 202. Keypoint generating unit 350 can generate the plurality of keypoints based on a texture criteria, such as, for example, FAST. The plurality of keypoints can each describe one or more pixels in the image frame that meet an appearance threshold criteria. As an example, if image data 202 includes an image frame, then keypoint generating unit 350 can determine keypoint data associated with image data 202 based on the image frame. The keypoint data can include a plurality of keypoints generated based on a texture criteria and that describe one or more pixels in the image frame that meet an appearance threshold criteria. As another example, if image data 202 includes previous image data and current image data, then keypoint generating unit 350 can determine previous keypoint data associated with the previous image data, and determine current keypoint data associated with the current image data. The previous keypoint data can include a plurality of keypoints that describe one or more pixels in the previous image frame that meet an appearance threshold criteria. The current keypoint data can include a plurality of keypoints that describe one or more pixels in the current image frame that meet an appearance threshold criteria. In some implementations, keypoint generating unit 350 can exclude one or more of the generated plurality of keypoints from the keypoint data based at least in part on the interesting range data determined by pixel exclusion unit 340. As an example, if image data 202 includes an image frame, then keypoint generating unit 330 can exclude a keypoint from keypoint data associated with image data 202 if the keypoint corresponds to a point in synchronized range data 304 that does not meet an interest-level threshold criteria. As another example, if image data 202 includes previous image data and current image data, then keypoint generating unit 330 can exclude a keypoint (e.g., a keypoint generated based on the previous image frame) from keypoint data associated with the previous image data if the keypoint corresponds to a point associated with the previous image data in synchronized range data 304 (e.g., a point in the first subset of points). Similarly, keypoint generating unit 330 can exclude a keypoint (e.g., a keypoint generated based on the current image frame) from keypoint data associated with the current image data if the keypoint corresponds to a point associated with the current image data in synchronized range data 304 (e.g., a point in the second subset of points).

State collator 360 can be configured to determine state data 402 that describes a state of a scene at a specific time. State data 402 can include image data 202 corresponding to the scene (e.g., image data 202 including an image frame depicting the scene, a capture time when the image frame was captured by one or more image sensors, and sensor-pose data associated with the one or more image sensors at the capture time) and synchronized range data 304 associated with image data 202 (e.g., a subset of range data 204 that meet a temporal proximity threshold criteria with respect to the capture time of the image frame depicting the scene). In some implementations, state data 402 can include range map data, interesting the range data, and keypoint data associated with image data 202 and synchronized range data 304. As an example, if image data 202 includes previous image data and current image data, then state collator 360 can determine state data 402 including previous state data and current state data. The previous state data can include the previous image data (e.g., the previous image frame, the previous capture time, and sensor-pose data associated with one or more image sensors that captured the previous image frame at the previous capture time), and synchronized range data 304 associated with the previous image data (e.g., the first subset of points). The previous state data can also include range map data associated with the previous image data (e.g., determined by range map generating unit 330), interesting range data associated with the previous image data (e.g., determined by pixel exclusion unit 340), and keypoint data associated with the previous image data (e.g., determined by keypoint generating unit 350). Similarly, the current state data can include the current image data (e.g., the current image frame, the current capture time, and sensor-pose data associated with one or more image sensors that captured the current image frame at the current capture time), and synchronized range data 304 associated with the current image data (e.g., the second subset of points). The current state data can also include range map data associated with the current image data (e.g., determined by range map generating unit 330), interesting range data associated with the current image data (e.g., determined by pixel exclusion unit 340), and keypoint data associated with the current image data (e.g., determined by keypoint generating unit 350). In this way, state collator 360 can determine state data 402 that describes a previous state of one or more objects (e.g., previous state data) and a current state of one or more objects (e.g., current state data). As another example, if image data 202 includes only current image data, then state collator 360 can determine state data 402 including previous state data based on previously determined state data, and current state data based on image data 202.

Figure 4:
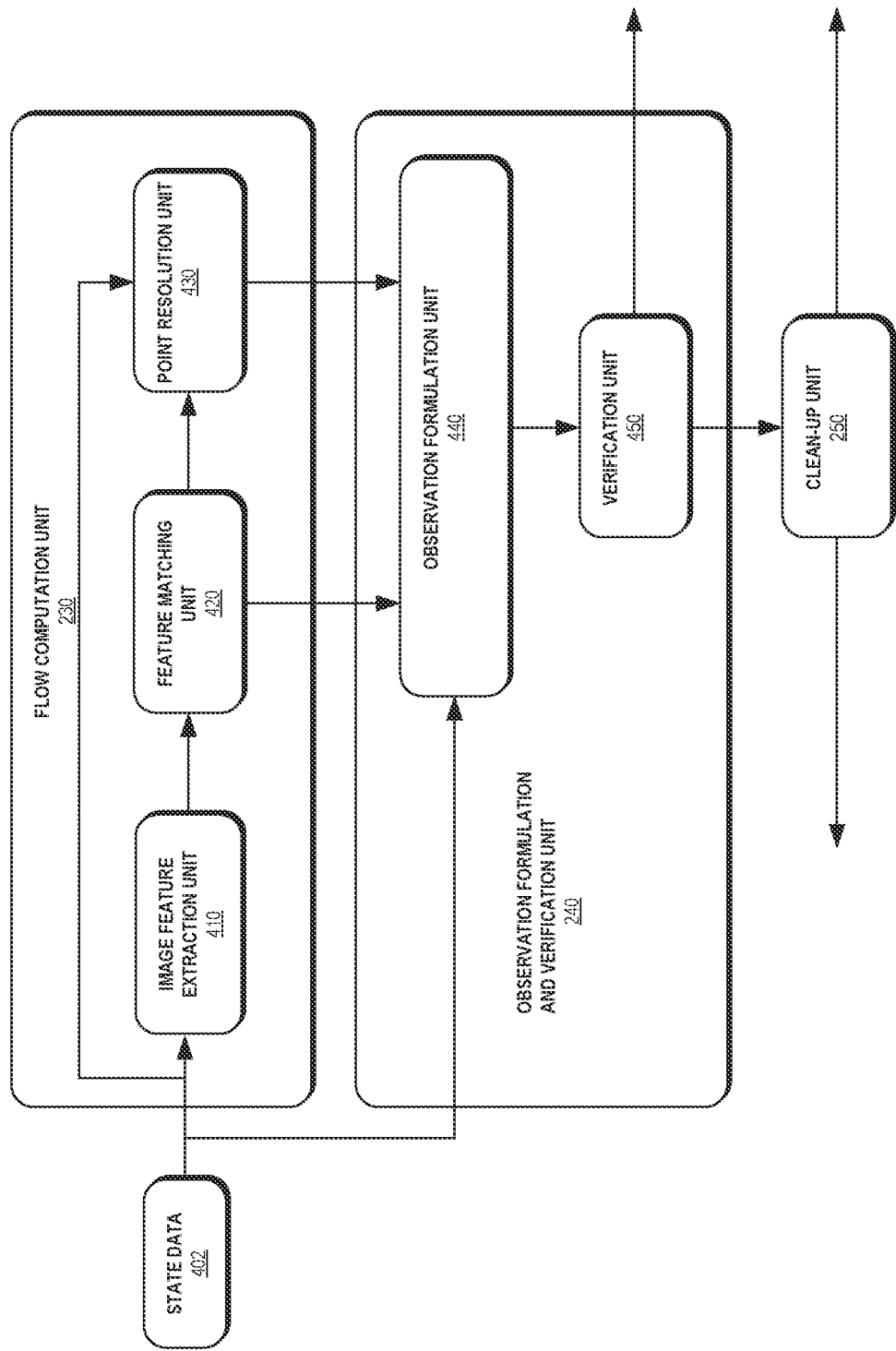
FIG. 4 depicts an example flow computation unit and an example observation formulation and verification unit of the movement detection system according to example embodiments of the present disclosure.

As shown in FIG. 4, flow computation unit 230 can additionally include image feature extraction unit 410, image feature matching unit 420, and point resolution unit 430. Flow computation unit 230 can be configured to receive state data 402 from state manager 220, and determine flow data indicative of a flow between previous state data and current state data. The flow data can include matched-feature data 502 and point resolution data 504 (shown in FIG. 5).

Image feature extraction unit 410 can be configured to extract one or more image features from an image frame. As an example, state data 402 can include a previous image frame (e.g., an image frame associated with previous state data) and a current image frame (e.g., an image frame associated with current state data). Image feature extraction unit 410 can extract a first set of image features from the previous image frame, and extract a second set of image features from the current image frame. The first set of image features can describe one or more pixels in the previous image frame that represent one or more portions of a scene depicted by the previous image frame (e.g., one or more objects in the scene depicted by the previous image frame). The second set of image features can describe one or more pixels in the current image frame that represent one or more portions of a scene depicted by the current image frame (e.g., one or more objects in the scene depicted by the current image frame). In some implementations, image feature extraction unit 410 can be configured to extract the first set of image features from the previous image frame based at least in part on keypoint data associated with the previous state data, and extract the second set of images from the current image frame based at least in part on keypoint data associated with the current state data. For example, image feature extraction unit 410 can extract the first set of image features based on one or more pixels in the previous image frame that correspond to a keypoint in the keypoint data associated with the previous state data. Similarly, image feature extraction unit 410 can extract the second set of image features based on one or more pixels in the current image frame that correspond to a keypoint in the keypoint data associated with the current state data. Examples of features include objects, edges, curves, shapes, colors, textures, and the like. For instance, an image feature may describe an entire object, (e.g., a vehicle) or a portion of an object (e.g., a tail light of a vehicle). Generally, image features do not vary with changes such as lighting, rotation, angle, scale, etc. Accordingly, image features can be detected and tracked between different images.

Image feature matching unit 420 can be configured to determine matched-feature data 502 based on the image feature(s) extracted by the image feature extraction unit 410. The matched-feature data 502 can include one or more matching image features between the previous image frame and the current image frame. As an example, image feature matching unit 420 can determine matched feature data 502 based on one or more image features in the first set of image features that match one or more image features in the second set of image features. In this way, image feature matching unit 420 can determine one or more pixels in the previous image frame and one or more pixels in the current image frame that represent the same object, for each of one or more objects described by matched-feature data 502.

Point resolution unit 430 can be configured to determine point resolution data 504 based on state data 402 and matched-feature data 502. Point resolution unit 504 can include a range value associated with one or more pixels that correspond to an object (e.g., an image feature in matched-feature data 502) in the previous image frame and the current image frame. The one or more pixels can include pixels representing a portion of a scene depicted by the previous image frame, and pixels representing a portion of a scene depicted by the current image frame. As an example, point resolution unit 504 can determine one or more first pixels in the previous image frame that correspond to one or more image features in matched-feature data 502, and determine one or more second pixels in the current image frame that correspond to one or more image features in matched-feature data 502. Point resolution unit 504 can determine a range value associated with the first pixel(s) and a range value associated with the second pixel(s) based on synchronized range data and sensor-pose data associated with the previous image frame and the current image frame, respectively.

As shown in FIG. 4, observation formulation and verification unit 240 can additionally include observation formulation unit 440, and verification unit 450. Observation formulation unit 440 can be configured to determine a velocity associated with one or more portions of one or more scenes (e.g., one or more objects in the one or more scenes) described by matched-feature data 502, and observation formulation unit 440 will be described in more detail with regard to FIG. 5. Verification unit 450 can be configured to obtain one or more velocities associated with one or more portions of a scene (e.g., determined by observation formulation unit 440) and verify one or more of the velocities. In some implementations, verification unit 450 can compare a determined velocity for a portion of a scene (e.g., an object in the scene) with a velocity threshold criteria. As an example, verification unit 450 can compare a determined velocity with a predetermined velocity value (e.g., 25 m/s). Verification unit 450 can verify the determined velocity if it is below the predetermined velocity value, and include the determined velocity in data provided by movement detection system 138 or perception system 128 to prediction system 130 for tracking the object. In some implementations, verification unit 450 can be configured to determine diagnostics data associated with verifying the one or more determined velocities. Verification unit 450 can provide the diagnostics data to clean-up unit 250 to perform clean-up operations.

Clean-up unit 250 can be configured to perform clean-up operations subsequent to verifying the one or more determined velocities. As an example, clean-up unit 250 can analyze diagnostics data received from verification unit 450 to determine if one or more errors occurred when the one or more velocities were determined. If clean-up unit 250 determines that one or more errors occurred, then clean-up unit 250 can clear a processing pipeline of movement detection system 138. If clean-up unit 250 determines that no errors occurred, then clean-up unit 250 can provide state data 402 to state manager 220 for use in a next iteration. In some implementations, clean-up unit 250 can be configured to provide the diagnostics data to one or more other systems for further analysis/processing, or output the diagnostics data for a developer to debug/improve movement detection system 138.

Figure 5:
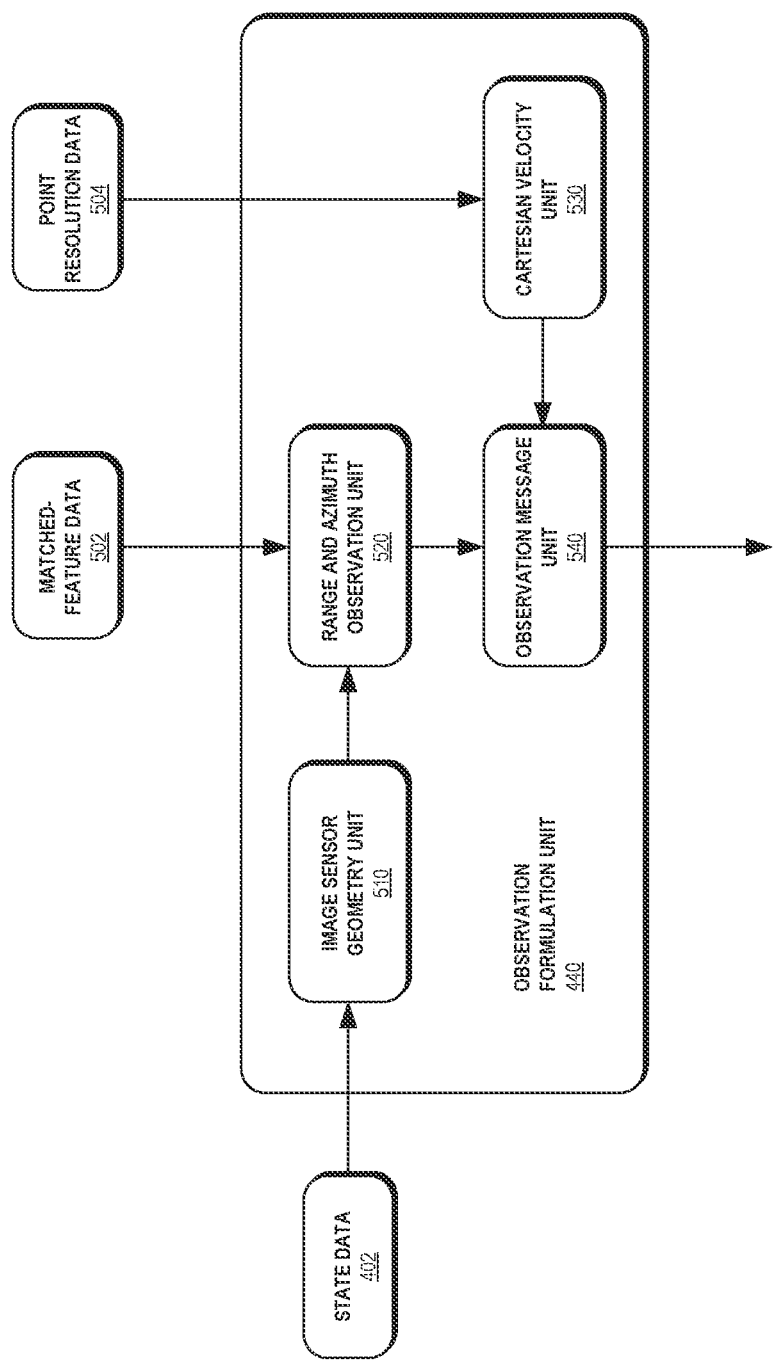
FIG. 5 depicts an example observation formulation unit of the movement detection system according to example embodiments of the present disclosure.

As shown in FIG. 5, observation formulation unit 440 can additionally include image sensor geometry unit 510, range and azimuth observation unit 520, cartesian velocity unit 530, and observation message unit 540.

Cartesian velocity unit 530 can be configured to determine a Cartesian velocity for one or more portions of a scene (e.g., one or more objects in the scene). As an example, cartesian velocity unit 530 can determine a previous three-dimensional position of a portion of a scene (e.g., an object) depicted by a previous image frame, and a current three-dimensional position of a corresponding portion of a scene (e.g., the object) depicted by a current image frame, based on point resolution data 504 determined by point resolution unit 430. Cartesian velocity unit 530 can determine the previous three-dimensional position based on one or more points in point resolution data 504 that correspond to one or more pixels that represent the portion of the scene in the previous image frame (e.g., that depict the object in the previous image frame). Similarly, cartesian velocity unit 530 can determine the current three-dimensional position based on one or more points in point resolution data 504 that correspond to one or more pixels that represent the portion of the scene in the current image frame (e.g., that depict the object in the current image frame). Cartesian velocity unit 530 can compare the previous three-dimensional position and current three-dimensional positions to determine a three-dimensional Cartesian velocity for the portion of the scene in the current image frame (e.g., the object depicted in the current image frame). Cartesian velocity unit 530 can determine a three-dimensional Cartesian velocity for each of one or more portions of one or more scenes corresponding to the one or more image features in matched-feature data 502.

Image sensor geometry unit 510 can be configured to determine a center of an image sensor used to capture an image frame. As an example, state data 402 can include previous image data and current image data. Image sensor geometry unit 510 can obtain sensor-pose data associated with one or more first image sensors used to capture the previous image frame in the previous image data, and determine a center of the one or more first image sensors based on the sensor-pose data. Similarly, image sensor geometry unit 510 can obtain sensor-pose data associated with one or more second image sensors used to capture the current image frame in the current image data, and determine a center of the one or more second image sensors based on the sensor-pose data.

Range and azimuth observation unit 540 can be configured to determine an angle and range for an object with respect to a previous image frame and a current image frame, respectively. In some implementations, the range and azimuth observation unit 540 can determine an angle and a range for a portion of a scene (e.g., an object in the scene) depicted by the previous image frame; and determine an angle and a range for a portion of a scene (e.g., an object in the scene) depicted by the current image frame. As an example, range and azimuth observation unit 540 can determine a previous angle and range for a portion of a scene depicted by the previous image frame (e.g., an object) described in matched-feature data 502 with respect to one or more first image sensors used to capture the previous image frame; and determine a current angle and range for a portion of a scene depicted by the current image frame (e.g., the object), corresponding to the portion of the scene depicted by the previous image frame, with respect to one or more second image sensors used to capture the current image frame. In particular, range and azimuth observation unit 540 can determine the previous angle and the previous range for an object with respect to the center of the one or more first image sensors, and determine the current angle and the current range for the object with respect to the center of the one or more second image sensors. In some implementations, range and azimuth observation unit 540 can compare the previous angle and range for the object with the current angle and range for the object to determine a velocity for the object. In some implementations, range and azimuth observation unit 540 can provide data including the previous and current positons for the object to one or more other systems (e.g., prediction system 130) for further processing (e.g., determining the velocity and/or tracking the object).

Observation message unit 540 can be configured to determine observation message data including a position and/or velocity of one or more portions of one or more scenes (e.g., one or more objects in the one or more scenes) described by matched-feature data 502. Observation message unit 540 can provide the observation message data to, for example, verification unit 450 for verification. The observation message data can include a Cartesian velocity for one or more portions of one or more scenes (e.g., determined by cartesian velocity unit 530), and/or range and azimuth values for one or more portions of one or more scenes (e.g., determined by range and azimuth observation unit 520).

Figure 6:
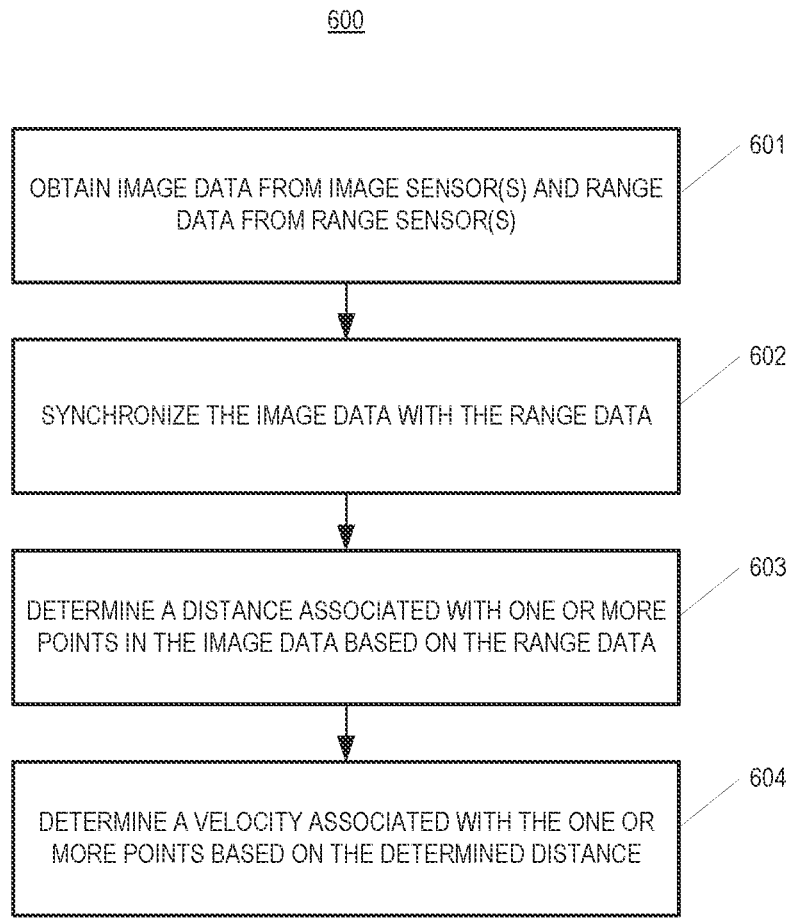
FIG. 6 depicts a flow diagram of an example method for detecting a velocity of one or more objects according to example embodiments of the present disclosure.

FIG. 6 depicts a flow diagram of an example method 600 for a movement detection system, according to example embodiments of the present disclosure. One or more portion(s) of the method 600 can be implemented as operations by one or more computing system(s) such as computing system(s) 103, and 710 shown in FIGS. 1 and 7. For example, FIG. 5 illustrates certain operations being performed by specific computing systems described herein. However, it should be appreciated that such operations may generally be performed by any suitable computing system or combination of computing systems consistent with the disclosure provided herein. Moreover, one or more portion(s) of the method 600 can be implemented as an algorithm on the hardware components of the system(s) described herein (e.g., as in FIGS. 1 and 7), for example, to detect a movement (e.g., position and/or velocity) of one or more portions of a scene (e.g., one or more objects in the scene). FIG. 6 depicts elements performed in a particular order for purposes of illustration and discussion. Those of ordinary skill in the art, using the disclosures provided herein, will understand that the elements of method 600 discussed herein can be adapted, rearranged, expanded, omitted, combined, and/or modified in various ways without deviating from the scope of the present disclosure.

FIG. 6 depicts a flow diagram of method 600 for a movement detection system according to example embodiments of the present disclosure. At (601), the method 600 includes obtaining image data from one or more image sensors and range data from one or more range sensors. For example, movement detection system 138 can obtain image data 202 and range data 204 representing a scene external to vehicle(s) 10. Image data 202 can include previous image data and current image data that include a first image (e.g., previous image frame) and a second image (e.g., current image frame), respectively. In some implementations, the previous image frame and the current image frame can be captured consecutively in time. In some implementations, range data 204 can be obtained from one or more range sensors and can include a plurality of range values indicative of a distance to one or more points at one or more times.

At (602), the method 600 includes synchronizing the image data with the range data. For example, movement detection system 138 can include sensor data synchronizer 210 that determines a first time (e.g., previous capture time) associated with the previous image frame, and a second time (e.g., current capture time) associated with the current image frame. Sensor data synchronizer 210 can identify one or more first range values in range data 204 that are associated with the previous capture time, and one or more second range values in the range data 204 that are associated with the current capture time. Sensor data synchronizer 210 can associate the one or more first range values with the previous image frame, and associate the one or more second range values with the current image frame.

At (603), the method 600 includes determining a distance associated with one or more points in the image data based on the range data. For example, movement detection system 138 can determine matched-feature data 502 by identifying a set of corresponding image features from image data 202, the set of corresponding image features including at least a first feature in the previous image frame having a correspondence with a second feature in the current image frame. In some implementations, movement detection system 138 can identify one or more keypoints based on image data 202, and generate the first feature and the second feature from image data 202 based on the one or more keypoints. For example, keypoint generating unit 350 can determine previous keypoint data associated with the previous image data, and determine current keypoint data associated with the current image data. Image feature extraction unit 410 can extract a set of previous image features from the previous image frame based on the keypoint data associated with the previous image data, and extract a set of current image features from the current image frame based on the keypoint data associated with the current image data. Feature matching unit 420 can determine matched-feature data 502 from the image feature(s) extracted by the image feature extraction unit 410 based on one or more matching criteria. The matched-feature data 502 can include one or more matching image features between previous image frame and the current image frame. Movement detection system 138 can determine a first feature in the previous image data and a second feature in the current image data that both correspond to an image feature in matched-feature data 502. In some implementations, movement detection system 138 can identify the one or more keypoints by identifying a plurality of points in the previous image frame and the current image frame that meet one or more appearance threshold criteria, and determining the one or more keypoints based on the plurality of points and range data 204. For example, keypoint generating unit 350 can determine one or more keypoints in the previous image frame that meet one or more appearance threshold criteria, and determine one or more keypoints in the current image frame that meet one or more threshold appearance criteria. Pixel exclusion unit 340 can determine one or more pixels to exclude from the keypoint data associated with the previous image data based on synchronized range data 304 associated with the previous image data, and determine one or more pixels to exclude from the keypoint data associated with the current image data based on synchronized range data 304 associated with the current image data.

In some implementations, movement detection system 138 can determine a respective distance for each of the first feature in the previous image frame and the second feature in the current image frame based on the range data 202. In particular, the first feature can correspond to one or more pixels in the previous image frame, and the second feature can correspond to one or more pixels in the current image frame. Movement detection system 138 can generate a set of two-dimensional matched points based on the one or more pixels in the previous image frame and the one or more pixels in the current image frame. Movement detection system 138 can determine the respective distance for the first feature in the previous image frame and the respective distance for the second feature in the current image frame based on the set of two-dimensional matched points.

At (604), the method 600 includes determining a velocity associated with the one or more points based on the determined distance. For example, movement detection system 138 can determine a velocity associated with an object represented by the set of corresponding image features based on the respective distance for the first feature and the respective distance for the second feature. In some implementations, movement detection system 138 can generate data indicative of one or more object detections based on the velocity associated with the object represented by the set of corresponding image features. In particular, movement detection system 138 can determine a position of the first feature with respect to one or more image sensors used to capture the previous image frame, and a position of the second feature with respect to one or more image sensors used to capture the current image frame. Additionally, or alternatively, movement detection system 138 can determine a continuous coordinate space corresponding to the previous image frame and the current image frame based on a geometry of the one or more image sensors used to capture the previous image frame and current image frame, respectively. Movement detection system 138 can determine a position of the first feature in the continuous coordinate space at the previous time (e.g., the capture time of the previous image frame) and a position of the second feature in the continuous coordinate space at the current time (e.g., the capture time of the current image frame). In some implementations, movement detection system 138 can perform a verification of the velocity associated with the object represented by the set of corresponding image features based on one or more verification criteria, and movement detection system 138 can provide the velocity associated with the object to a tracking system based on the verification.

Figure 7:
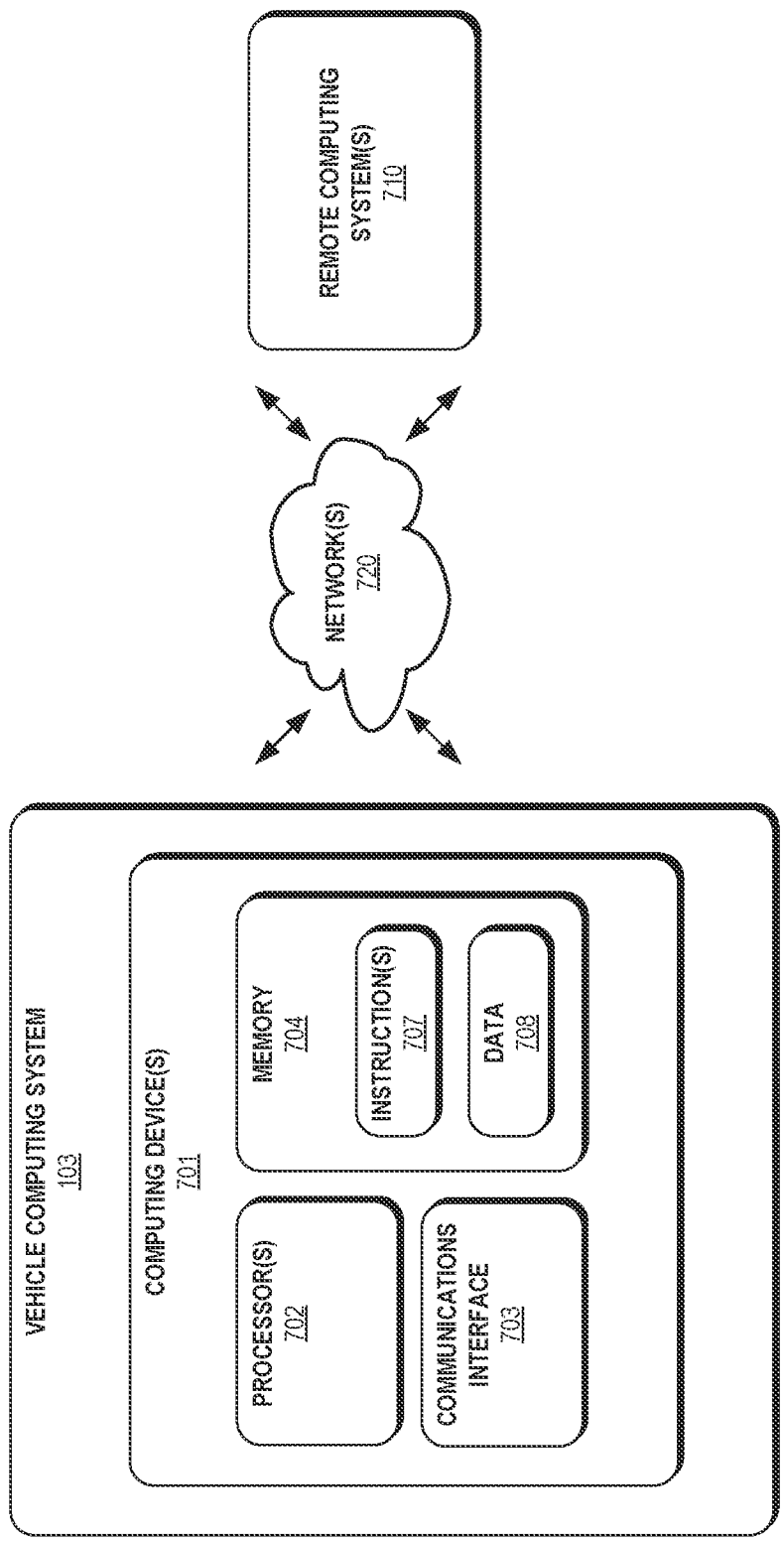
FIG. 7 depicts example system components according to example embodiments of the present disclosure.

FIG. 7 depicts an example computing system 700 according to example embodiments of the present disclosure. The example system 700 illustrated in FIG. 7 is provided as an example only. The components, systems, connections, and/or other aspects illustrated in FIG. 7 are optional and are provided as examples of what is possible, but not required, to implement the present disclosure. The example system 700 can include vehicle computing system 103 of vehicle(s) 10 and, in some implementations, remote computing system(s) 710 including one or more remote computing system(s) that are remote from vehicle(s) 10 that can be communicatively coupled to one another over one or more networks 720. The remote computing system 710 can be associated with a central operations system and/or an entity associated with the vehicle(s) 10 such as, for example, a fleet operator, service provider, etc.

The computing device(s) 701 of the vehicle computing system 103 can include processor(s) 702 and a memory 704. The one or more processors 702 can be any suitable processing device (e.g., a processor core, a microprocessor, an ASIC, a FPGA, a controller, a microcontroller, etc.) and can be one processor or a plurality of processors that are operatively connected. The memory 704 can include one or more non-transitory computer-readable storage media, such as RAM, ROM, EEPROM, EPROM, one or more memory devices, flash memory devices, etc., and combinations thereof.

The memory 704 can store information that can be accessed by the one or more processors 702. For instance, the memory 704 (e.g., one or more non-transitory computer-readable storage mediums, memory devices) on-board the vehicle(s) 10 can include computer-readable instructions 706 that can be executed by the one or more processors 702. The instructions 706 can be software written in any suitable programming language or can be implemented in hardware. Additionally, or alternatively, the instructions 706 can be executed in logically and/or virtually separate threads on processor(s) 702.

For example, the memory 704 on-board the vehicle(s) 10 can store instructions 706 that when executed by the one or more processors 702 on-board the vehicle(s) 10 cause the one or more processors 702 (the vehicle computing system 103) to perform operations such as any of the operations and functions of the vehicle computing system 103, as described herein, one or more operations of method 600, and/or any other operations and functions of the vehicle computing system 103, as described herein.

The memory 704 can store data 708 that can be obtained, received, accessed, written, manipulated, created, and/or stored. The data 708 can include, for instance, data associated with sensors, perception, prediction, motion plan, and/or other data/information as described herein. In some implementations, the computing device(s) 701 can obtain data from one or more memory device(s) that are remote from the vehicle(s) 10.

The computing device(s) 701 can also include a communication interface 703 used to communicate with one or more other system(s) on-board the vehicle(s) 10 and/or a remote computing device that is remote from the vehicle(s) 10 (e.g., of remote computing system(s) 710). The communication interface 703 can include any circuits, components, software, etc. for communicating via one or more networks (e.g., 720). In some implementations, the communication interface 703 can include, for example, one or more of a communications controller, receiver, transceiver, transmitter, port, conductors, software, and/or hardware for communicating data.

The network(s) 720 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 720 can be accomplished, for instance, via a communication interface using any type of protocol, protection scheme, encoding, format, packaging, etc.

The remote computing system 710 can include one or more remote computing devices that are remote from the vehicle computing system 103. The remote computing devices can include components (e.g., processor(s), memory, instructions, and data) similar to that described herein for the computing device(s) 701. Moreover, the remote computing system(s) 710 can be configured to perform one or more operations of the vehicle computing system 103, as described herein. Moreover, the computing systems of other vehicle(s) 10 described herein can include components similar to that of vehicle computing system 103.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The communications between computing systems described herein can occur directly between the systems or indirectly between the systems. For example, in some implementations, the computing systems can communicate via one or more intermediary computing systems. The intermediary computing systems may alter the communicated data in some manner before communicating it to another computing system.

The number and configuration of elements shown in the figures is not meant to be limiting. More or less of those elements and/or different configurations can be utilized in various embodiments.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method comprising:
obtaining, by a computing system including one or more computing devices, image data and range data representing a scene external to an autonomous vehicle, the image data including at least a first image and a second image;
determining, by the computing system, synchronized sensor data based at least in part on the image data and the range data,
wherein the synchronized sensor data is based at least in part on a first time associated with the first image, a second time associated with the second image, one or more first range values in the range data associated with the first time, and one or more second range values in the range data associated with the second time;
determining, by the computing system, state data that describes a state of the scene at one or more times based at least in part on the synchronized sensor data; and
determining, by the computing system, at least one of a velocity or a position associated with an object in the scene based at least in part on the state data.

2. The computer-implemented method of claim 1, wherein the synchronized sensor data comprises the image data and synchronized range data associated with the image data.

3. The computer-implemented method of claim 1, wherein determining the synchronized sensor data comprises:
identifying, by the computing system, the one or more first range values in the range data that are associated with the first time, and the one or more second range values in the range data that are associated with the second time; and
associating, by the computing system, the one or more first range values with the first image, and the one or more second range values with the second image to synchronize the image data and the range data.

4. The computer-implemented method of claim 1, wherein the state data comprises past state data and current state data.

5. The computer-implemented method of claim 4, wherein the past state data describes one or more past states of the scene.

6. The computer-implemented method of claim 1, the method further comprising:
generating, by the computing system, data indicative of one or more movement detections based at least in part on the velocity associated with the object in the scene, wherein the object is represented by a set of corresponding image features in the first and second images.

7. The computer-implemented method of claim 6, wherein the set of corresponding image features in the first and second images comprise a first feature and a second feature that satisfy one or more matching criteria.

8. The computer-implemented method of claim 6, wherein generating the data indicative of one or more movement detections comprises:
determining, by the computing system, a position of the first feature with respect to an image sensor used to capture the first image, and a position of the second feature with respect to an image sensor used to capture the second image.

9. The computer-implemented method of claim 1, wherein the range data is obtained from one or more LIDAR sensors and includes a plurality of range values indicative of a distance to one or more points in the scene at one or more times.

10. A computing system, comprising:
one or more processors; and
a computer-readable medium having instructions stored thereon that, when executed by the one or more processors, cause the computing system to perform one or more operations, the operations comprising:
obtaining image data and range data representing a scene external to an autonomous vehicle, the image data including at least a first image and a second image;
determining synchronized sensor data based at least in part on the image data and the range data,
wherein the synchronized sensor data is based at least in part on a first time associated with the first image, a second time associated with the second image, one or more first range values in the range data associated with the first time, and one or more second range values in the range data associated with the second time;
determining state data that describes a state of the scene at one or more times based at least in part on the synchronized sensor data; and
determining at least one of a velocity or a position associated with an object in the scene based at least in part on the state data.

11. The computing system of claim 10, wherein determining the state data based at least in part on the image data and the range data comprises:
determining the state data based at least in part on an interest-level criteria.

12. The computing system of claim 10, wherein the state data comprises a first state and a second state, and wherein the operations further comprise:
determining a flow between the first state and the second state.

13. The computing system of claim 10, wherein the synchronized sensor data comprises the image data and synchronized range data associated with the image data.

14. The computing system of claim 10, wherein determining the synchronized sensor data comprises:
identifying the one or more first range values in the range data that are associated with the first time, and the one or more second range values in the range data that are associated with the second time; and
associating the one or more first range values with the first image, and the one or more second range values with the second image.

15. The computing system of claim 10, wherein the range data comprises LIDAR sensor data.

16. An autonomous vehicle comprising:
one or more processors; and
a computer-readable medium having instructions stored thereon that, when executed by the one or more processors, cause the autonomous vehicle to perform one or more operations, the operations comprising:

obtaining image data and range data representing a scene external to the autonomous vehicle, the image data including at least a first image and a second image;

determining synchronized sensor data based at least in part on the image data and the range data, wherein the synchronized sensor data is based at least in part on a first time associated with the first image, a second time associated with the second image, one or more first range values in the range data associated with the first time, and one or more second range values in the range data associated with the second time;

determining state data that describes a state of the scene at one or more times based at least in part on the synchronized sensor data; and determining at least one of a velocity or a position associated with an object in the scene based at least in part on the state data.

17. The autonomous vehicle of claim 16, wherein the operations further comprise:

predicting a future position of the object based at least in part on at least one of the velocity or the position.

18. The autonomous vehicle of claim 17, wherein the operations further comprise:

generating a motion plan for the autonomous vehicle based at least in part on at least one of the future position of the object or the state data.

19. The autonomous vehicle of claim 16, wherein the state data comprises past state data and current state data.

20. The autonomous vehicle of claim 16, wherein the synchronized sensor data comprises the image data and synchronized range data associated with the image data.

* * * * *